(12) United States Patent
Choi

(10) Patent No.: US 10,144,410 B2
(45) Date of Patent: Dec. 4, 2018

(54) APPARATUS FOR CALCULATING OPERATIONAL TIME OF HYBRID CONSTRUCTION MACHINE AND METHOD THEREFOR

(71) Applicants: VOLVO CONSTRUCTION EQUIPMENT AB, Eskilstuna (SE); Dong-Uk Choi, Gyeongsangnam-do (KR)

(72) Inventor: Dong-Uk Choi, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 29 days.

(21) Appl. No.: 15/305,701

(22) PCT Filed: Apr. 24, 2014

(86) PCT No.: PCT/KR2014/003620
§ 371 (c)(1),
(2) Date: Oct. 21, 2016

(87) PCT Pub. No.: WO2015/163498
PCT Pub. Date: Oct. 29, 2015

(65) Prior Publication Data
US 2017/0043758 A1    Feb. 16, 2017

(51) Int. Cl.
*B60W 20/10*    (2016.01)
*H01M 10/48*    (2006.01)
(Continued)

(52) U.S. Cl.
CPC .............. *B60W 20/10* (2013.01); *B60K 6/26* (2013.01); *B60K 6/28* (2013.01); *E02F 9/2075* (2013.01);
(Continued)

(58) Field of Classification Search
None
See application file for complete search history.

(56) References Cited

U.S. PATENT DOCUMENTS 5,461,292 A * 10/1995 Zondlo ................... G01S 13/74
180/169
5,667,029 A * 9/1997 Urban .................... B60K 6/442
180/65.23
(Continued)

FOREIGN PATENT DOCUMENTS

CN    101454513 A    6/2009
CN    104221265 A    12/2014
(Continued)

OTHER PUBLICATIONS

DE 102014216931 A1 english translation from google patents.*
(Continued)

*Primary Examiner* — Jean Paul Cass
(74) *Attorney, Agent, or Firm* — Harness, Dickey & Pierce, P.L.C.

(57) ABSTRACT

A hybrid construction machine is disclosed, which comprises an engine, a generator, the generator connected to the engine, a converter connected to the generator, and an ESS (Energy Storage System) connected to the converter. The hybrid construction machine further comprises a converter current detector positioned either between the converter and the generator or between the converter and the ESS to detect the current flowing between the converter and the generator, an ESS current detector positioned between the converter and the ESS to detect the current flowing between the converter and the ESS, a processing unit receiving the current detected from the converter current detector and the ESS current detector and calculating the operation time of the respective component, and a display unit displaying the operation time of the respective component. Since the
(Continued)

hybrid construction machine calculates the operation time of the respective component and displays the same to an operator.

10 Claims, 4 Drawing Sheets

(51) Int. Cl.
    *B60K 6/26*         (2007.10)
    *B60K 6/28*         (2007.10)
    *E02F 9/20*         (2006.01)
    *E02F 9/26*         (2006.01)
    *B60K 6/46*         (2007.10)
    *B60K 25/02*       (2006.01)

(52) U.S. Cl.
    CPC ............ *E02F 9/2091* (2013.01); *E02F 9/267* (2013.01); *H01M 10/48* (2013.01); *B60K 6/46* (2013.01); *B60K 25/02* (2013.01); *B60Y 2200/41* (2013.01); *B60Y 2200/92* (2013.01); *B60Y 2300/60* (2013.01); *B60Y 2300/91* (2013.01); *B60Y 2400/112* (2013.01); *B60Y 2400/60* (2013.01); *Y10S 903/906* (2013.01); *Y10S 903/907* (2013.01)

(56) References Cited

U.S. PATENT DOCUMENTS

| | | | |
|---|---|---|---|
| 5,704,440 A * | 1/1998 | Urban | B60L 11/123 180/65.23 |
| 5,937,013 A * | 8/1999 | Lam | H03D 3/006 375/340 |
| 8,616,312 B2 | 12/2013 | Connolly et al. | |
| 9,230,761 B2 | 1/2016 | Kim et al. | |
| 2001/0035737 A1 * | 11/2001 | Nakanishi | G01R 31/3624 320/122 |
| 2005/0263329 A1 | 12/2005 | Kuras et al. | |
| 2006/0206246 A1 * | 9/2006 | Walker | G06Q 10/00 701/16 |
| 2007/0201172 A1 * | 8/2007 | Hayashi | H02H 7/122 361/52 |
| 2009/0139781 A1 * | 6/2009 | Straubel | B60L 11/1875 180/65.1 |
| 2009/0140745 A1 * | 6/2009 | Williams | G01R 31/2829 324/522 |
| 2009/0237280 A1 * | 9/2009 | Ashmore, Jr. | H03M 3/382 341/120 |
| 2010/0125435 A1 * | 5/2010 | Pong | G06F 1/28 702/182 |
| 2010/0231701 A1 * | 9/2010 | Nelson | G02B 27/26 348/58 |
| 2010/0280777 A1 * | 11/2010 | Jin | B60L 3/0046 702/63 |
| 2012/0075672 A1 * | 3/2012 | Oishi | G06F 3/1204 358/1.15 |
| 2012/0077515 A1 * | 3/2012 | Oishi | H04W 4/023 455/456.1 |
| 2012/0170325 A1 * | 7/2012 | Jin | H02M 7/48 363/21.09 |
| 2013/0058750 A1 | 3/2013 | Hiroki et al. | |
| 2013/0069545 A1 * | 3/2013 | Seo | H05B 33/0818 315/186 |
| 2014/0060019 A1 * | 3/2014 | Schulte | B60K 6/48 60/327 |
| 2015/0022105 A1 * | 1/2015 | Walker | H02M 1/36 315/200 R |
| 2016/0214503 A1 * | 7/2016 | Orita | B60K 6/48 |

FOREIGN PATENT DOCUMENTS

| | | |
|---|---|---|
| EP | 1213394 A1 | 6/2002 |
| EP | 2573281 A1 | 3/2013 |
| JP | H08104492 A | 4/1996 |
| JP | H11160467 A | 6/1999 |
| JP | H11324029 A | 11/1999 |
| JP | 2012140772 A | 7/2012 |
| KR | 20070039243 A | 4/2007 |
| KR | 101263948 B1 | 5/2013 |
| KR | 1020130103326 A | 9/2013 |

OTHER PUBLICATIONS

European Search Report for EP 14 89 0182 dated Nov. 7, 2017 (8 pages).
International Search Report (in English and Korean) for PCT/KR2014/003620, dated Jan. 22, 2015; ISA/KR.

* cited by examiner

[Fig. 1]
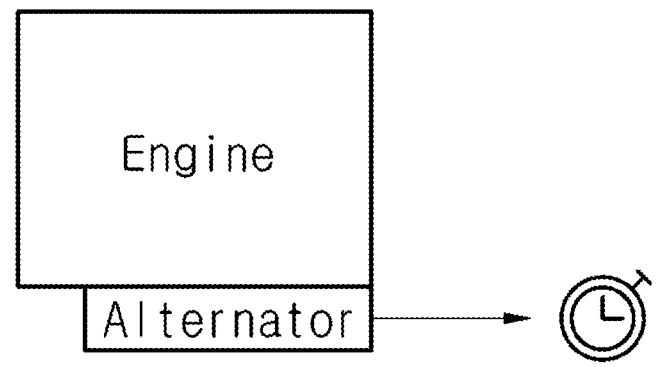
Prior Art

[Fig. 2]
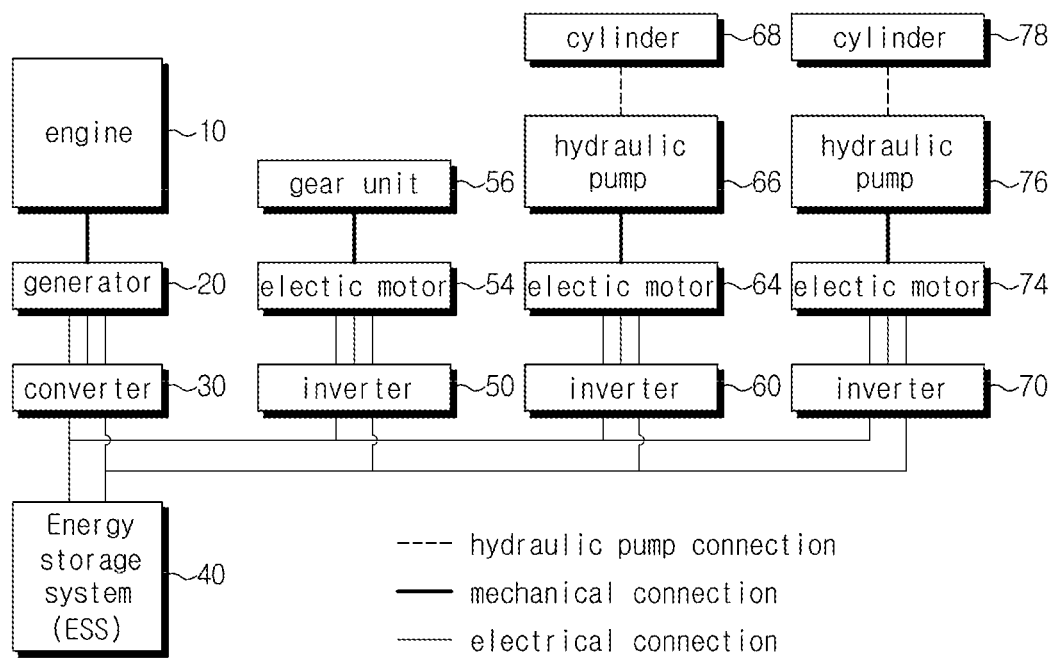

[Fig. 3]
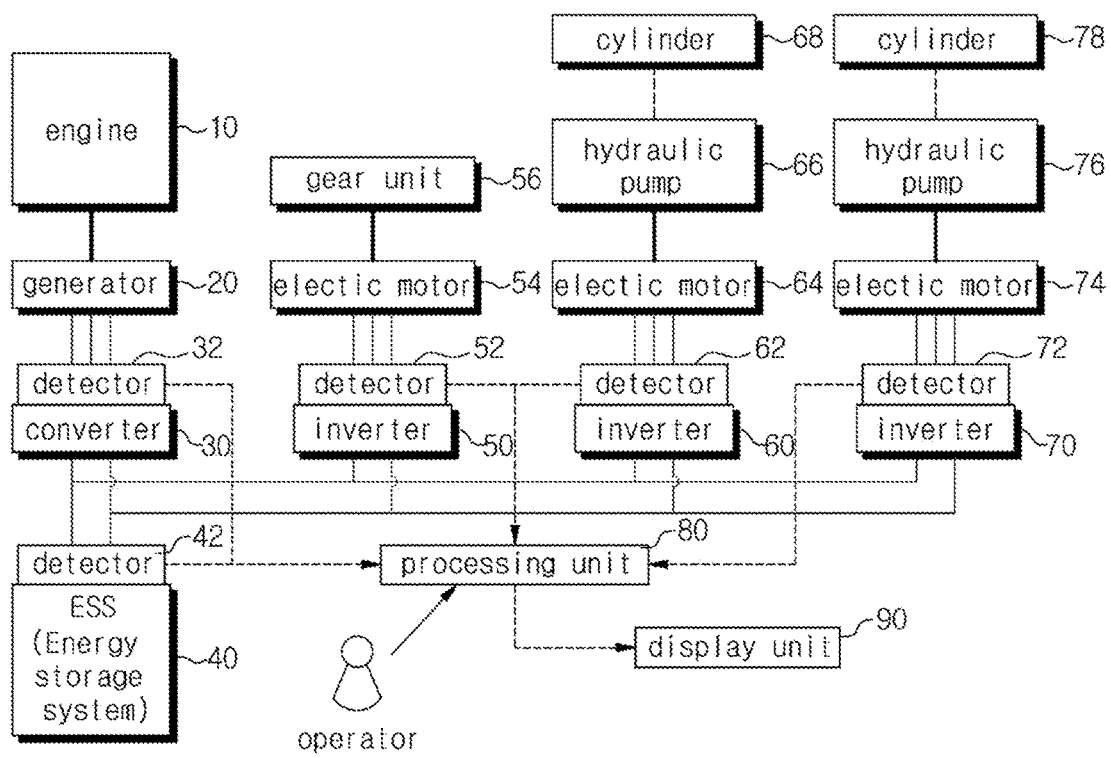

[Fig. 4]
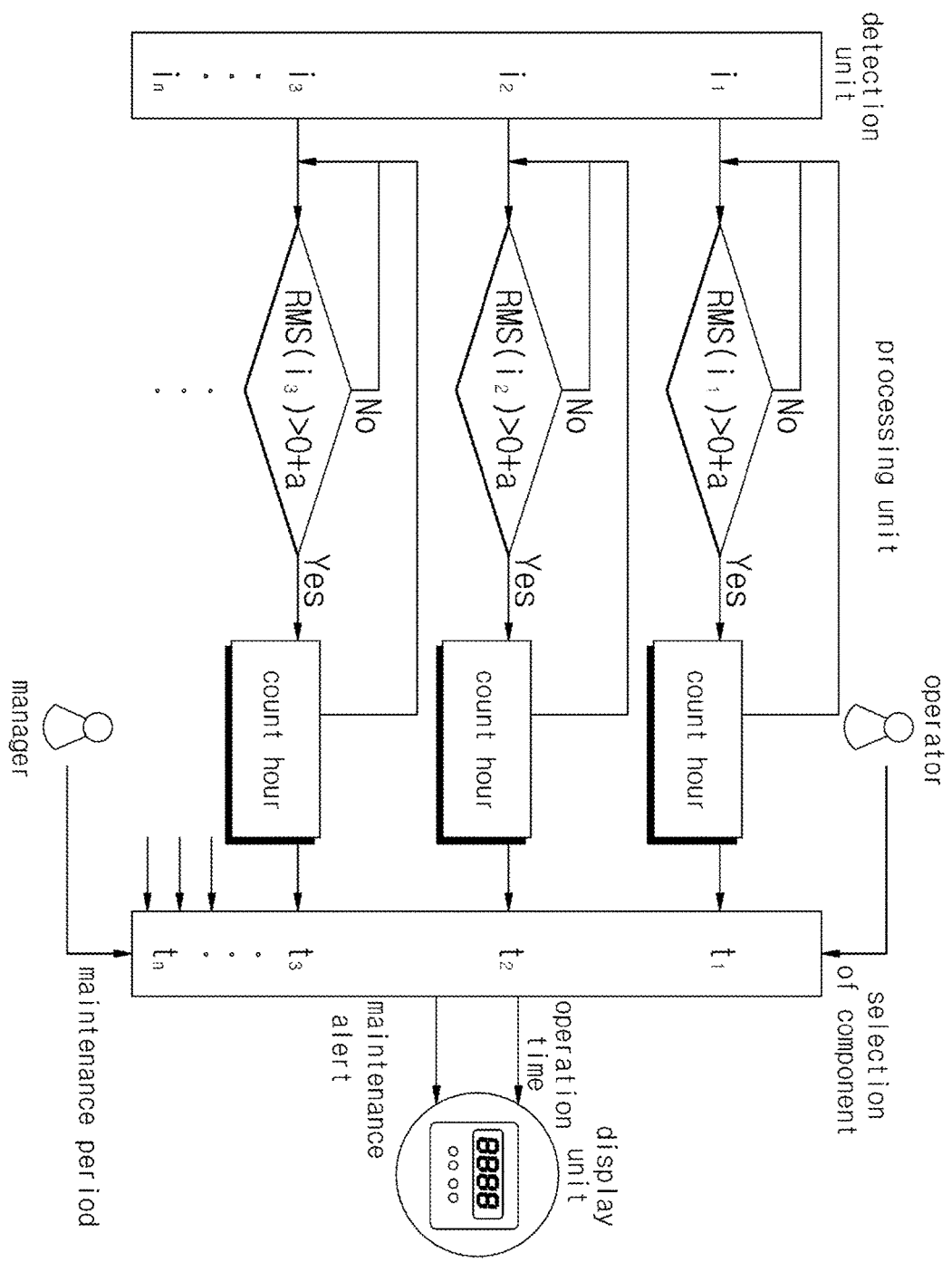

APPARATUS FOR CALCULATING OPERATIONAL TIME OF HYBRID CONSTRUCTION MACHINE AND METHOD THEREFOR

CROSS-REFERENCE TO RELATED APPLICATIONS

This application is a 371 U.S. National Stage of International Application No. PCT/KR2014/003620, filed on Apr. 24, 2014. The entire disclosure of the above application is incorporated herein by reference.

TECHNICAL FIELD

The present invention relates to an apparatus for calculating operational time of hybrid construction machine and method therefor.

BACKGROUND OF THE INVENTION

As shown in FIG. 1 in case of the general construction machine, an operation time of a machine is calculated using an output from an alternator connected mechanically with an engine. That is, a conventional construction machine recognizes the operation of a machine only when an engine is operated, and sends the operation time of the machine to a display. An operator confirms the operation time displayed as described above for the maintenance of the components of the machine.

When such a system is applied for an electric hybrid construction machine as shown in FIG. 2, it is impossible to calculate accurately the operation time of component which is not directly associated with an engine, since the electric hybrid construction machine can be operated only by an energy stored in ESS (Energy Storage System) that is independent of the operation state of the engine. For example, in case of the single operation of driving only EMI (Electrical Motor), it is impossible to calculate the operation time of the individual work device (component) using the general calculation method of FIG. 1.

Consequently, a conventional technique makes it difficult to predict the individual operation time of the respective main component and manage the maintenance period of the respective component. Accordingly, a conventional technique makes it difficult for an operator to efficiently maintain the components, and an operator may miss the proper time of replacing the components. This causes the operator the unnecessary maintenance costs, and the machine that has not been properly maintained causes trouble or requires the additional maintenance, which lowers the availability of the machine.

SUMMARY OF THE INVENTION

Accordingly, the present invention has been made to solve the aforementioned problems occurring in the related art, and it is an object of the present invention to improve the productivity of a hybrid construction machine by minimizing the down time and the additionally required maintenance time for the main components of the hybrid construction machine, which is enabled by calculating the accurate operation time of the respective component, and thereby maximizing the operation period of the machine.

Technical Solution

To achieve the above and other objects, in accordance with an embodiment of the present invention, there is provided a hybrid construction machine having at least one of electric work device in which the current flow of the respective work device is measured and the operation time is calculated as it recognizes that the corresponding work device is under operation when the current flow of the respective work device exceeds a certain value. The operator can confirm the operation time of the respective component, and according to the embodiment of the present invention, the maintenance alert can be reported when the operation time of the respective component gets close to the predetermined maintenance period. This facilitates the maintenance of the respective work device (component) embedded in the hybrid construction machine, further improves the availability of the machine and contributes to the increased productivity of the hybrid construction machine.

Advantageous Effect

According to the embodiment of the present invention, the problem can be solved that could occur when the conventional calculation technique is applied for calculating the operation time of the electric hybrid construction machine. For example, in order to assess the actual operation time of the respective work device, the current flowing between the respective EM (Electric Motor) and inverter is measured and thereby the individual operation time of the work device connected with EM can be calculated. As a result, the hybrid construction machine according to the embodiment of the present invention can calculate the operation time of the respective work device, and can report the result to the operator so that the operator can maintain the work devices properly in time.

Furthermore, by comparing the calculated operation time of the respective component with the predetermined maintenance period of the component, the maintenance alert can be reported to the operator so that the operator can take the maintenance action when the calculated operation time gets close to the maintenance period.

BRIEF DESCRIPTION OF THE DRAWINGS

FIG. 1 represents the diagram illustrating the conventional measurement method of the operation time by the alternator connected to the engine.

FIG. 2 is a schematic diagram of a hybrid construction machine according to an embodiment of the present invention.

FIG. 3 is a mimetic diagram to calculate the operation time of the respective component embedded in a hybrid construction machine according to an embodiment of the present invention.

FIG. 4 is a schematic diagram to process the operation time of the component in the processing unit according to an embodiment of the present invention.

DETAILED DESCRIPTION OF THE INVENTION

Hereinafter, the present invention will be described in detail with reference to the accompanying drawings.

Although the present invention has been described with reference to the preferred embodiment in the attached figures, it is to be understood that various equivalent modifications and variations of the embodiments can be made by a person having an ordinary skill in the art without departing from the spirit and scope of the present invention as recited in the claims.

In order to explain clearly the present invention, the irrelevant parts have been omitted, and like reference numerals designate like elements throughout the specification.

Throughout the specification, unless explicitly described to the contrary, the "comprise" will be understood to imply the inclusion of stated elements but not the exclusion of any other elements.

FIG. 1 represents the diagram illustrating the conventional measurement method of the operation time by the alternator connected to the engine. In the conventional technique, it has been common that a construction machine uses the power generated only by an engine as a power source. Accordingly, in order to obtain the operation time of the construction machine, the output generated by the alternator connected with the engine has been measured. However, this technique is difficult to be applied for the hybrid scheme utilizing ESS (Energy Storage System) and all sorts of the electric motor.

FIG. 2 is a schematic diagram of a hybrid construction machine according to an embodiment of the present invention. The hybrid construction machine according to FIG. 2 comprises at least one of work device operated by a generator and an electric motor which are mechanically connected with an engine, and may further comprise at least one of ESS for storing the energy generated by the generator and the work device, which supply the energy to the electric motor for the operation of the work device.

FIG. 3 is a mimetic diagram to calculate the operation time of the respective component embedded in a hybrid construction machine according to an embodiment of the present invention.

A hybrid construction machine according to an embodiment of the present invention comprises an engine (10), a generator (20) connected to the engine, and a converter (30) that converts the energy generated by the generator for allowing the energy to be stored in ESS (40). The engine (10) and the generator (20) is connected mechanically with each other, while the connection between the generator (20) and the converter (30) as well as the connection between the converter (30) and ESS (40) are made electrically so that the current over a certain level can flow between the respective components when the respective components are operated. Thus, the operation time of the respective components can be calculated by measuring the current generated in the operation.

According to an embodiment, a converter current detector (32) detects the current flowing between the generator and the converter. The electric lines (converter lines) flowing through the converter can exist in a plurality, and can be joined at around the ESS, in which the current sensors may be arranged in a plurality of converter lines. Accordingly, the converter current detector (32) can be positioned either between the converter (30) and the generator (20) or between the converter (30) and ESS. ESS current detector is positioned between the converter (30) and ESS, and detects the current flowing between the converter (30) and ESS. A hybrid construction machine according to an embodiment of the present invention comprises a processing unit (80) that receives the currents detected from the converter current detector (32) as well as ESS current detector (42) and calculates the operation time of the respective component; and a display unit (90) displaying the operation time of the respective component.

However, since the noise generated along the electric line and the error associated with the current always exist, the simple measurement of current does not allow the accurate calculation of the operation time of component, and also it needs to be considered that the current may flow in the opposite directions. Accordingly, when the current (i) is measured in the detector, the processing unit calculates the RMS (root mean square) of the currents considering the currents of opposite directions, and sets the predetermined dead zone to ignore the line noise and the measurement error. In a hybrid construction machine according to an embodiment of the present invention, the processing unit sets the dead zone as 'a', and counts the operation time as the time for which the current (i) is kept above 0+a.

That is, the processing unit sets the current level of 'a' that can be generated by the line noise and the error, which also may be set by the operator, manager, or repair man.

When RMS value of the current detected by the converter current detector is more than 0+a, the processing unit recognizes that the converter is under operation and counts the operation time of the converter. In other words, if RMS(i1)>0+a is satisfied assuming that the current flowing in the converter current detector is i1, the processing unit recognizes that the converter is under operation.

This can be applied to ESS current detector as well, in which the processing unit sets the current level of 'a' that can be generated by the line noise and the error, and when RMS value of the current detected by the ESS current detector is more than 0+a, the processing unit recognizes that ESS is under operation and counts the operation time of ESS.

A hybrid construction machine according to another embodiment of the present invention comprises further an inverter (50) connected to ESS, and an electric motor (54) connected to the inverter, wherein a gear unit (56) may be connected to the electric motor for the driving and turning of the construction machine. An inverter current detector (52) is positioned between the inverter and the electric motor and detects the current flowing between the inverter and the electric motor, while the processing unit (80) receives the current detected from the inverter current detector and calculates the operation time of the respective component. Also, the hybrid construction machine may comprise a display unit (90) displaying the operation time of the respective component.

In this embodiment, the processing unit sets the current level of 'a' that can be generated by the line noise and the error, and when RMS value of the current detected by the inverter current detector is more than 0+a, the processing unit recognizes that inverter is under operation and counts the operation times of inverter, electric motor and gear unit.

A hybrid construction machine according to another embodiment of the present invention may comprise further at least one of the inverter (60, 70) connected to ESS, at least one of the electric motor (64, 74) connected respectively to the inverter, at least one of the hydraulic pump (66, 76) connected respectively to the electric motor and at least one of the cylinder (68, 78) respectively connected to the hydraulic pump. The inverter current detectors (62, 72) are positioned between the at least one of the inverter and the at least one of the electric motor, respectively, and detect the current flowing between the respective inverter and the respective electric motor. The processing unit (80) receives the current detected from the inverter current detector and calculates the operation time of the respective component, and a display unit (90) displays the operation time of the respective component.

In this embodiment, since the electric motor is connected to the hydraulic pump and the cylinder, the operation times of the work components such as arm or bucket of the construction machine that are connected to the hydraulic pump can be calculated by measuring the current flowing between the inverter and the electric motor. This is made possible because the hydraulic pump and the cylinder are operated with each other when the electric motor is operated by the inverter.

In such embodiment, the processing unit sets the current level of 'a' that can be generated by the line noise and the error, and when RMS value of the current detected by the inverter current detector is more than 0+a, the processing unit recognizes that inverter is under operation and can count the operation times of inverter, electric motor, hydraulic pump and cylinder.

FIG. 4 is a schematic diagram to process the operation time of the component in the processing unit according to an embodiment of the present invention.

A processing unit of a hybrid construction machine according to an embodiment of the present invention keeps monitoring the current detected by the detector, stores the calculated operation time (t), and calculates the accumulated operation time (t). Also, if RMS of the detected current (i) is less than 0+a, the calculation of the operation time (t) is stopped. At this time, the detected currents of the respective component can be denoted as i1, i2, 13, . . . in, and the operation times of the respective component can be denoted as t1, t2, t3, . . . tn. The operation time can be received by the processing unit on the operator input and the operation times of the main components (elements) can be displayed as the operator wants to.

If the operation time exceeds the maintenance period, the processing unit may either display the maintenance alert on the display or transmit the maintenance alert to the management server by using the wireline or wireless communication devices. This efficiently helps managing the maintenance period of the respective component. The maintenance period can be predetermined for the respective component by the manager or the repair man.

What is claimed is:

1. A hybrid construction machine comprising;
an engine;
a generator connected to the engine;
a converter connected to the generator, and an electrical storage system ("ESS") connected to the converter, a converter current detector that is positioned between the converter and the generator and detects a current flowing from the generator to the converter and from the converter to the generator;
an ESS current detector that is positioned between the converter and the ESS, and
detects the current flowing from the converter to the ESS and from the ESS to the converter: and
a processing unit that receives the currents detected by the converter current detector as well as the ESS current detector, and calculates an operation time of a respective component;
wherein the processing unit sets the current level of 'a' as a current level that is generated by an electric line noise and an error, and
when RMS (Root Mean Square) value of the current detected by the converter current detector is more than 0+a,
the processing unit recognizes that the converter is under operation and counts the operation time of the converter: and
wherein the processing unit sets the current level of 'a* as a current level that is generated by said electric line noise and said error, and
when said RMS (Root Mean Square) value of the current detected by the ESS current detector is more than 0+a,
the processing unit recognizes that the ESS is under operation and counts the operation time of the ESS".

2. The hybrid construction machine of claim 1, further comprising a display unit displaying the operation time of the respective component.

3. A hybrid construction machine comprising:
an engine,
a generator connected to the engine,
a converter connected to the generator,
a ESS connected to the converter,
an electric motor connected to an inverter;
an inverter current detector that is positioned between the inverter and the electric motor, and detects a current flowing from the electric motor to the inverter and from the inverter to the electric motor; and
a processing unit that receives the current detected by the inverter current detector, and calculates an operation time of a respective component;
wherein the processing unit sets the current level of 'a' as a current level that is generated by an electric line noise and an error, and when RMS (Root Mean Square) value of the current detected by the inverter current detector is more than 0+a, the processing unit recognizes that the inverter is under operation and counts the operation times of the inverter, the electric motor and a gear unit.

4. The hybrid construction machine of claim 3 further comprising a display unit displaying the operation time of the respective component.

5. A hybrid construction machine comprising:
an engine,
a generator connected to the engine,
a converter connected to the generator,
an electrical storage system ("ESS") connected to the converter,
at least one of inverters connected to the ESS;
at least one of electric motors connected respectively to the inverter;
hydraulic pumps connected respectively to the electric motor;
cylinders, each of which is connected to and driven by one of the hydraulic pumps;
at least one of the inverter current detectors that are positioned between the at least one of the inverters and the at least one of the electric motors, respectively, and
detect a current flowing from the respective electric motor to the respective inverter and from the respective inverter to the respective electric motor; and
a processing unit that receives the current detected from the inverter current detector and calculates an operation time of a respective component;
wherein the processing unit sets the current level of 'a' as a current level that is generated by an electric line noise and an error, and when RMS (Root Mean Square) value of the current detected by the inverter current detector is more than 0+a, the processing unit recognizes that the inverter is under operation and counts the operation times of the inverter, the electric motor, the hydraulic pumps and the cylinders.

6. The hybrid construction machine of claim 5, further comprising a display unit displaying the operation time of the respective component.

7. The hybrid construction machine of claim 1, wherein, if the operation time exceeds a maintenance period, the processing unit either displays a maintenance alert on a display or transmits the maintenance alert to management server by using a wireline or a plurality of wireless communication devices.

8. The hybrid construction machine of claim 1, wherein, if the operation time exceeds a maintenance period, the processing unit either displays a maintenance alert on a display unit or transmits the maintenance alert to the management server by using wirelines or wireless communication devices.

9. The hybrid construction machine of claim 3, wherein, if the operation time exceeds a maintenance period, the processing unit either displays a maintenance alert on a display unit or transmits the maintenance alert to a management server by using a plurality of wirelines or a plurality of wireless communication devices.

10. The hybrid construction machine of claim 5, wherein, if the operation time exceeds a maintenance period, the processing unit either displays a maintenance alert on a display unit or transmits the maintenance alert to a management server by using a plurality of wirelines or a plurality of wireless communication devices.

* * * * *